United States Patent
Oliver et al.

(10) Patent No.: US 10,127,077 B2
(45) Date of Patent: Nov. 13, 2018

(54) EVENT DISTRIBUTION PATTERN FOR USE WITH A DISTRIBUTED DATA GRID

(75) Inventors: Brian Oliver, Acton, MA (US); Noah Arliss, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 507 days.

(21) Appl. No.: 13/359,396

(22) Filed: Jan. 26, 2012

(65) Prior Publication Data

US 2012/0278817 A1 Nov. 1, 2012

Related U.S. Application Data

(60) Provisional application No. 61/479,342, filed on Apr. 26, 2011.

(51) Int. Cl.
  *G06F 9/48* (2006.01)
(52) U.S. Cl.
  CPC .................. *G06F 9/4843* (2013.01)
(58) Field of Classification Search
  CPC ........................................ G06F 9/4843
  See application file for complete search history.

(56) References Cited

U.S. PATENT DOCUMENTS

| | | | |
|---|---|---|---|
| 5,819,272 A | | 10/1998 | Benson |
| 5,987,506 A | * | 11/1999 | Carter et al. ................. 709/213 |
| 5,988,847 A | * | 11/1999 | McLaughlin et al. ............ 700/9 |
| 6,304,879 B1 | * | 10/2001 | Sobeski et al. |
| 6,519,652 B1 | * | 2/2003 | Sadiq ................ G06F 17/30607 718/104 |
| 6,772,203 B1 | * | 8/2004 | Feiertag et al. .............. 709/219 |
| 7,574,706 B2 | | 8/2009 | Meulemans et al. |
| 7,711,920 B2 | | 5/2010 | Borman et al. |
| 2002/0087630 A1 | * | 7/2002 | Wu .............................. 709/203 |
| 2002/0133735 A1 | * | 9/2002 | McKean .............. G06F 11/2092 714/5.11 |
| 2002/0184446 A1 | * | 12/2002 | Kagan et al. ................. 711/130 |

(Continued)

OTHER PUBLICATIONS

Ruzzi et al., Oracle Coherence, Jun. 2009, Release 3.5 Guide, 176 pages.*

(Continued)

*Primary Examiner* — S. Sough
*Assistant Examiner* — Carina Yun
(74) *Attorney, Agent, or Firm* — Tucker Ellis LLP

(57) ABSTRACT

An event distribution pattern is described for use with a distributed data grid. The grid can be comprised of a cluster of computer devices having a cache for storing data entries. An event distributor residing on at least one of those computer devices provides a domain for sending events to a desired end point destination and also provides the store and forward semantics for ensuring asynchronous delivery of those events. An event channel controller resides as an entry in the cache on at least one of computers in the cluster. This event channel controller receives the events defined by said application from the event distributor and provides the events to a set of event channels. Each event channel controller can include multiple event channel implementations for distributing the events to different destinations. The destinations can include local caches, remote caches, standard streams, files and JMS components.

20 Claims, 8 Drawing Sheets

(56) References Cited

U.S. PATENT DOCUMENTS

| | | | |
|---|---|---|---|
| 2003/0229674 A1* | 12/2003 | Cabrera et al. | 709/207 |
| 2004/0025071 A1* | 2/2004 | Vicard | 713/340 |
| 2004/0059870 A1* | 3/2004 | Ash | G06F 11/1666 711/119 |
| 2004/0172626 A1* | 9/2004 | Jalan et al. | 717/149 |
| 2005/0071850 A1* | 3/2005 | Ittel et al. | 719/320 |
| 2006/0248285 A1* | 11/2006 | Petev | 711/141 |
| 2007/0174160 A1 | 7/2007 | Solberg et al. | |
| 2008/0109599 A1 | 5/2008 | Smith | |
| 2011/0041006 A1 | 2/2011 | Fowler | |
| 2011/0126173 A1 | 5/2011 | Tzoref et al. | |
| 2011/0161289 A1 | 6/2011 | Pei et al. | |
| 2012/0158650 A1 | 6/2012 | Andre et al. | |
| 2012/0215740 A1 | 8/2012 | Vaillant et al. | |

OTHER PUBLICATIONS

Unknown Author, Live Distributed Object from Wikipedia, the free encyclopedia, Sep. 9, 2015, 4 pages. Retrieved from: https://en.wikipedia.org/wiki/Live_distributed_object.

* cited by examiner

EVENT DISTRIBUTION PATTERN FOR USE WITH A DISTRIBUTED DATA GRID

CLAIM OF PRIORITY

The present application claims the benefit of U.S. Provisional Patent Application No. 61/479,342, entitled "EVENT DISTRIBUTION PATTERN AND LIVE OBJECT PATTERN FOR A DISTRIBUTED DATA GRID," by Brian Oliver et al., filed on Apr. 26, 2011, which is incorporated herein by reference in its entirety.

CROSS REFERENCE TO RELATED APPLICATIONS

The present application is related to the following United States Provisional patent application, which is incorporated by reference herein in its entirety:

U.S. patent application Ser. No. 13/360,487, entitled "PUSH REPLICATION FOR USE WITH A DISTRIBUTED DATA GRID", by Brian Oliver et al., filed on Jan. 27, 2012, subsequently issued as U.S. Pat. No. 9,081,839 on Jul. 14, 2015.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to data caching techniques in distributed computing environments and in particular to distributing event information between clustered caches.

BACKGROUND

In recent years, the amount of information utilized by various organizations, businesses and consumers has exploded to reach enormous amounts. From enterprise resource planning (ERP) to customer resource management (CRM) and other systems, more and more parts of an organization are becoming optimized, thereby producing vast amounts of data relevant to the organization. All of this information needs to be collected, stored, managed, archived, searched and accessed in an efficient, scalable and reliable manner.

Historically, most enterprises have utilized large databases to store the majority of their data and used random access memory (RAM) to locally cache a subset of that data that is most frequently accessed. This has been done mainly to conserve costs since RAM has traditionally been faster but more expensive than disk-based storage. Over time, RAM has been continuously growing in storage capacity and declining in cost. However, these improvements have not kept up with the rapid rate of increase in data being used by enterprises and their numerous applications. In addition, because CPU advancements have generally outpaced memory speed improvements, it is expected that memory latency will become a bottleneck in computing performance.

Organizations today need to predictably scale mission-critical applications to provide fast and reliable access to frequently used data. It is desirable that data be pushed closer to the application for faster access and greater resource utilization. Additionally, continuous data availability and transactional integrity are needed even in the event of a server failure.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

BRIEF SUMMARY OF INVENTION

In accordance with various embodiments of the invention, an event distribution pattern is described for use with a distributed data grid. The event distribution pattern can provide a framework for distributing application event information from the data grid to other destinations. The grid can be comprised of a cluster of computer devices having a cache for storing data entries. An event distributor provides an infrastructure from which events are replicated to one or many desired end point destinations. The event distributor can reside on all devices engaged in distributing events, or at least one of those computer devices. The event distributor can provide a domain for sending events to a desired end point destination and can also provide the store and forward semantics for ensuring asynchronous delivery of those events. An event channel controller can reside as an entry in the cache on at least one of computers in the cluster. This event channel controller can consume the events defined by said application from the event distributor and provide the events to a set of event channels. Each event channel controller can include multiple event channel implementations for distributing the events to different destinations. The destinations can include local caches, remote caches, standard streams, files and JMS components.

DETAILED DESCRIPTION

In accordance with various embodiments of the invention, an event distribution pattern is described for use with a distributed data grid. The data grid is a system composed of multiple servers that work together to manage information and related operations—such as computations—in a distributed environment. An in-memory data grid then is a data grid that stores the information in memory to achieve higher performance and uses redundancy by keeping copies of that information synchronized across multiple servers to ensure resiliency of the system and the availability of the data in the event of server failure. The data grid is used as a data management system for application objects that are shared across multiple servers, require low response time, high throughput, predictable scalability, continuous availability and information reliability. As a result of these capabilities, the data grid is ideally suited for use in computational intensive, stateful middle-tier applications. The data management is targeted to run in the application tier, and is often run in-process with the application itself, for example in the application server cluster. In accordance with an embodiment, the data grid software is middleware that reliably manages data objects in memory across a plurality of servers and also brokers the supply and demand of data between applications and data sources. In addition, the data grid can push the processing of requests closer to the data residing in the grid. Rather than pulling the necessary information to the server that will be executing the process, the data grid can push the processing of the request to the server that is storing the information locally. This can greatly reduce latency and improve data access speeds for applications.

In accordance with various embodiments, the event distribution pattern provides an extensible and highly available framework to distribute application events occurring in one data grid cluster to one or more possibly distributed clusters, caches or other devices. These events can be any events as defined by the application having access to the data grid cluster. As an illustration, a stock trading application may wish to replicate information about all of the trades performed by a particular stock trader to a remote cluster. In order to implement this, the application can define the event to be any trade performed by the particular trader and can also select a particular channel or protocol (e.g. JMS queue, Extend, etc) over which the event information will be distributed.

Figure 1:
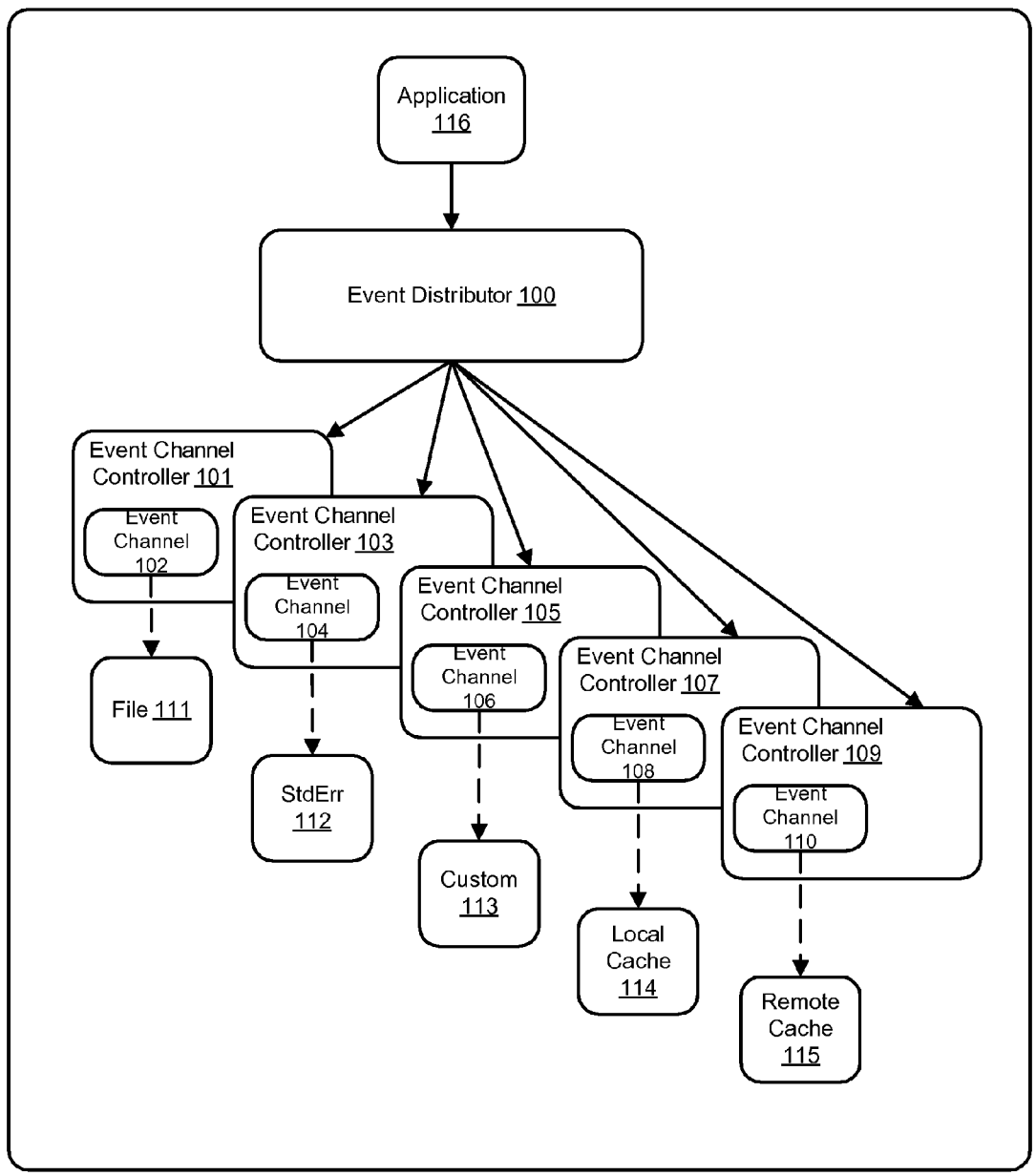
FIG. 1 is an illustration of the event distribution pattern, in accordance with various embodiments of the invention.

FIG. 1 is an illustration of the event distribution pattern, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, an event distributor 100 is used to distribute event information to remote destinations. In accordance with an embodiment, the event distributor 100 is an application-defined domain where related events can be sent for distribution. For example, a set of related events can be sent to a number of channels by using the distributor 100. In addition, there can be more than one distributor for other types of events that may be grouped for distribution. In accordance with an embodiment, each event distributor has a set of event channels (102, 104, 106, 108, 110). Each of those channels is responsible for sending batches of events to an end point (111, 112, 113, 114, 115). The event channel thus acts as a publisher of information that will be sent to another cluster.

In accordance with an embodiment, an event channel controller (101, 103, 105, 107, 109) manages the infrastructure to support an event channel and is responsible for ensuring that the infrastructure for that event channel is up and running. In accordance with an embodiment, the event channel controller provides the batch of events to the channel for delivery to an end point. As such, the channel is responsible for performing the actual distribution of the event to the end point. In accordance with various embodiments, the end points can include but are not limited to a local cache 114, writing to standard error stream (e.g. StdErr) 112, a file 111, and a remote cache 115. In accordance with an embodiment, each endpoint can be associated with a particular event channel implementation. Some examples of channel implementations can include the following:

File Event Channel—this channel writes events to a file.

Local Cache Event Channel—this channel relays events into a cache within the cluster in which the events have arrived.

Remote Cache Event Channel—this channel relays events into a cache over an extended connection (e.g. connection over a wide area network) to a remote cluster.

Remote Cluster Event Channel—this channel distributes events to another cluster over an extended connection, where it may be further distributed locally.

Standard Error Event Channel—this channel writes events to a standard I/O stream, such as stderr or stdout.

Figure 2:
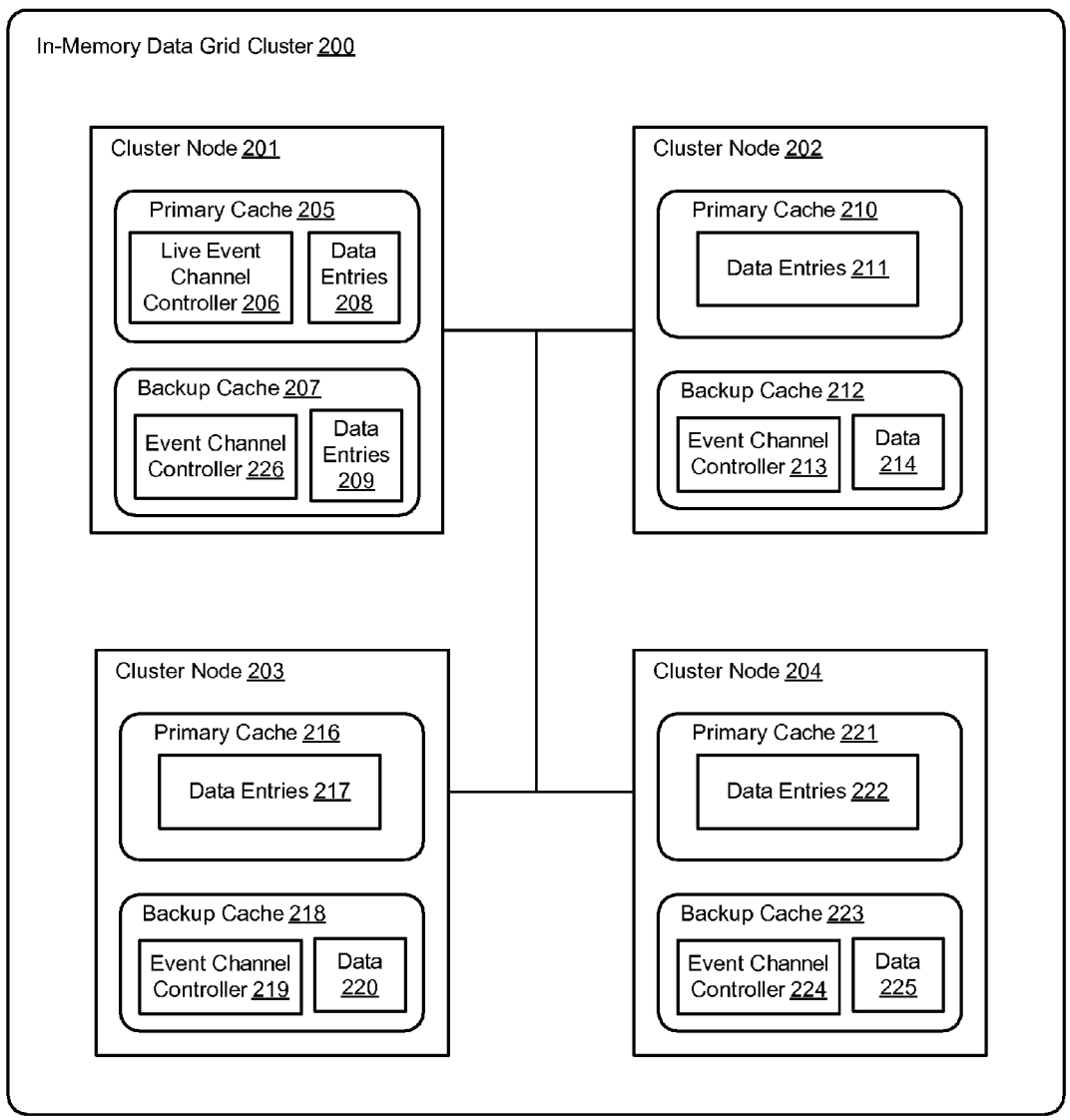
FIG. 2 is an illustration of an event channel controller in a distributed data grid, in accordance with various embodiments of the invention.

FIG. 2 is an illustration of an event channel controller in a distributed data grid, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the data grid 200 can comprise a plurality of cluster nodes (201, 202, 203, 204) having a primary caches (205, 210, 216, 221) as well as backup caches (207, 212, 218, 223) for fault tolerance. The caches store data entries (208, 209, 211, 214, 217, 220, 222, 225) which are accessible by application objects.

In accordance with an embodiment, the event channel controller 206 is a live object in the distributed data grid. A live object is data within the distributed cache, however the live object also has a lifecycle of its own and is capable of taking action based on state changes. In accordance with an embodiment, the live object is a cache entry in the distributed data grid. It can be placed into the cache by executing a standard "insert" or "put" operation. When the live object (event channel controller) arrives in the cache, a customized backing map listener on that node detects that the object implementing a particular interface has arrived in the cache and invokes its start method. Thereafter, this particular data entry in the cache (event channel controller 206) becomes live and running and can execute actions according to state changes. For example, every time the event is mutated, the event channel controller may receive a call back to perform a particular action, such as disable the replication of the event to a particular channel. In accordance with an embodiment, the event channel can include a suspended state during which it is not replicating events to the remote cluster or other destinations.

In accordance with an embodiment, there is one running event channel controller 206 for every destination that the events need to be distributed to. The event channel controller is backed up (213, 219, 224, and 226) across the clustered cache, and therefore provides high availability in the case of process/machine failure. In the event that the node hosting the event channel controller fails, the event channel controller can be promoted from the backup to the primary cache one of the remaining different nodes. Upon promoting (inserting) the event channel controller to the primary cache on the new node, the backing map listener would activate it to a live object as previously described. In accordance with an embodiment, this provides the same fault tolerance and high availability for the live object process as is provided to the data in the clustered cache.

In accordance with various embodiments, live objects may be used to model configuration, scheduled jobs and points of integration with resources external to the distributed data cluster. Most cached entries can be considered dead objects because they do not react or perform an action when interacted with. A live object is one that handles or processes events that occur on or about itself. Thus, when an object self-processes its events, the processing may further self-mutate or change the state of the said object thus causing it move to another state or stage in its lifecycle. That series of state changes can be considered an object's lifecycle.

In accordance with an embodiment, a live object (e.g. event channel controller) is simply a cache entry in the distributed data grid. Upon each mutation (state change) of the live object, the distributed data grid backs up the state of the object and thus, live objects are always recoverable to a well-known state. In addition, the data grid can implement both distributed live objects and replicated live objects. A distributed live object is distributed across members (nodes) of the cluster. A replicated live object is where every member of the cluster contains the same live object.

In accordance with various embodiments, several implementations of the live object pattern are possible within the data grid. In one implementation, a developer can use BML to capture events on cache entries in the distributed data grid. BML can then be used to call methods on the mutated cache entry (live object). In addition, the distributed data grid can provide an API to implement the live object pattern. The API can include methods for implementing the live object interface. For example, a developer can have the following options of live object types for implementation:
  Option 1: Implement LiveObject interface
  Option 2: Implement AsynchronousLiveObject interface
  Option 3: Implement EventProcessor<EntryEvent>
  Option 4: Extend AbstractLiveObject
  Option 5: Extend AbstractAsynchronousLiveObject
  Option 6: Extend AbstractEventProcessor<EntryEvent>
  Option 7: Extend AbstractAsynchronousEventProcessor<EntryEvent>

Figure 3:
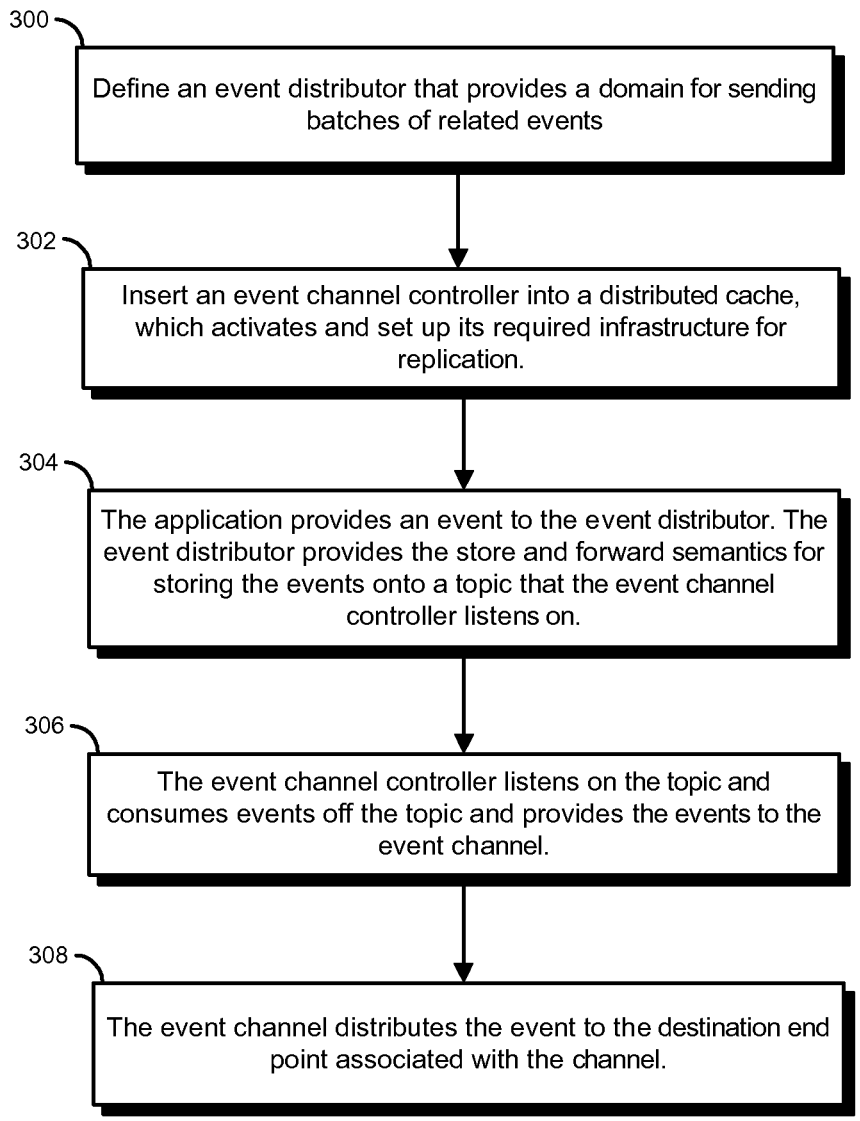
FIG. 3 is a flow chart illustration of event distribution for a distributed data grid, in accordance with various embodiments of the invention.

FIG. 3 is a flow chart illustration of event distribution for a distributed data grid, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated, in step 300, an event distributor is defined. The distributor provides an application defined domain for sending batches of events and also provides the store and forward semantics (e.g. topics, queues, etc) for ensuring asynchronous delivery of those events. In step 302, an event channel controller is inserted into a distributed cache. This insert can cause the event channel controller to activate and set up its required infrastructure for replication. In step 304, the application provides an event to an event distributor. The event distributor provides the store and forward semantics for storing the events onto a topic that the event channel controllers are expected to be listening on. In step 306, the event channel controller listens on the topic and consumes batches of events off the topic and provides the batches of events to an event channel. In step 308, the event channel distributes the event to the destination end point associated with the channel. Additionally, the above flow can include an event transformation step that allows an event channel controller to filter or modify the events before they are actively delivered to the desired end points.

Figure 4:
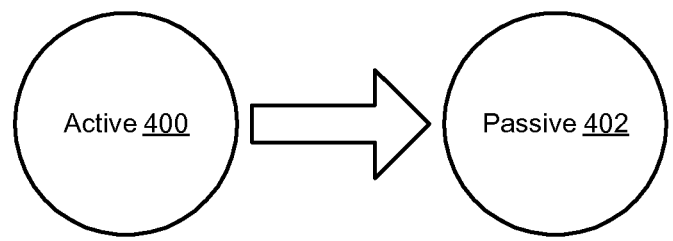
FIGS. 4-8 illustrate the various topologies of event distribution between clusters, in accordance with various embodiments of the invention.

FIGS. 4-8 illustrate the various topologies of event distribution between clusters, in accordance with various embodiments of the invention. FIG. 4 illustrates the active/passive deployment of event distribution, in accordance with various embodiments of the invention. This is the simplest topology where the active cluster 400 hosts the read/write applications and the passive cluster 402 contains read-only applications. Here, one primary active cluster is being updated in real time and the passive backup cluster is slightly behind (because of the event distribution being asynchronous). The backup cluster however can also be used as a query engine.

Figure 5:
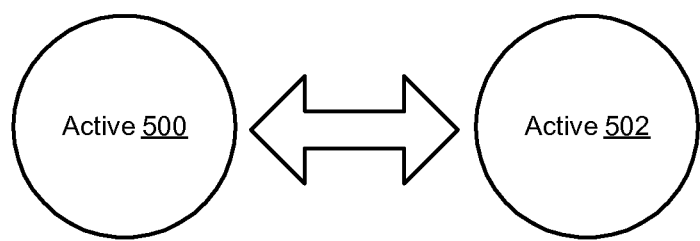

FIG. 5 is an illustration of the active/active deployment of event distribution in accordance with various embodiments of the invention. In this topology, there are bi-directional events being asynchronously transmitted between both active clusters 500 and 502. One possible use case for this could be two trader sites, one in New York and one in London and both trading platforms wish to know what the other site is up to. Another use case could be a disaster recovery situation where if one of the active clusters goes down, the other is available to take over the processing of requests in a live manner. The failover cluster can then immediately take over the failed cluster with a very close approximation of the data that was on the original cluster. When the failed cluster comes back online, it can synchronize with the failover cluster via this active/active topology and resume processing the requests as before the failure. The active/active topology can allow multiple clusters to support read/write applications. This permits overlapping writes on the same entry. In accordance with an embodiment, applications register a conflict resolver class which detects overlapping writes and provides in-flight resolution. In accordance with an embodiment, conflict resolution includes at least three options: keep the source entry, keep the target entry or merge the source and target entries. The active/active use case can support multiple activity across multiple clusters.

Figure 6:
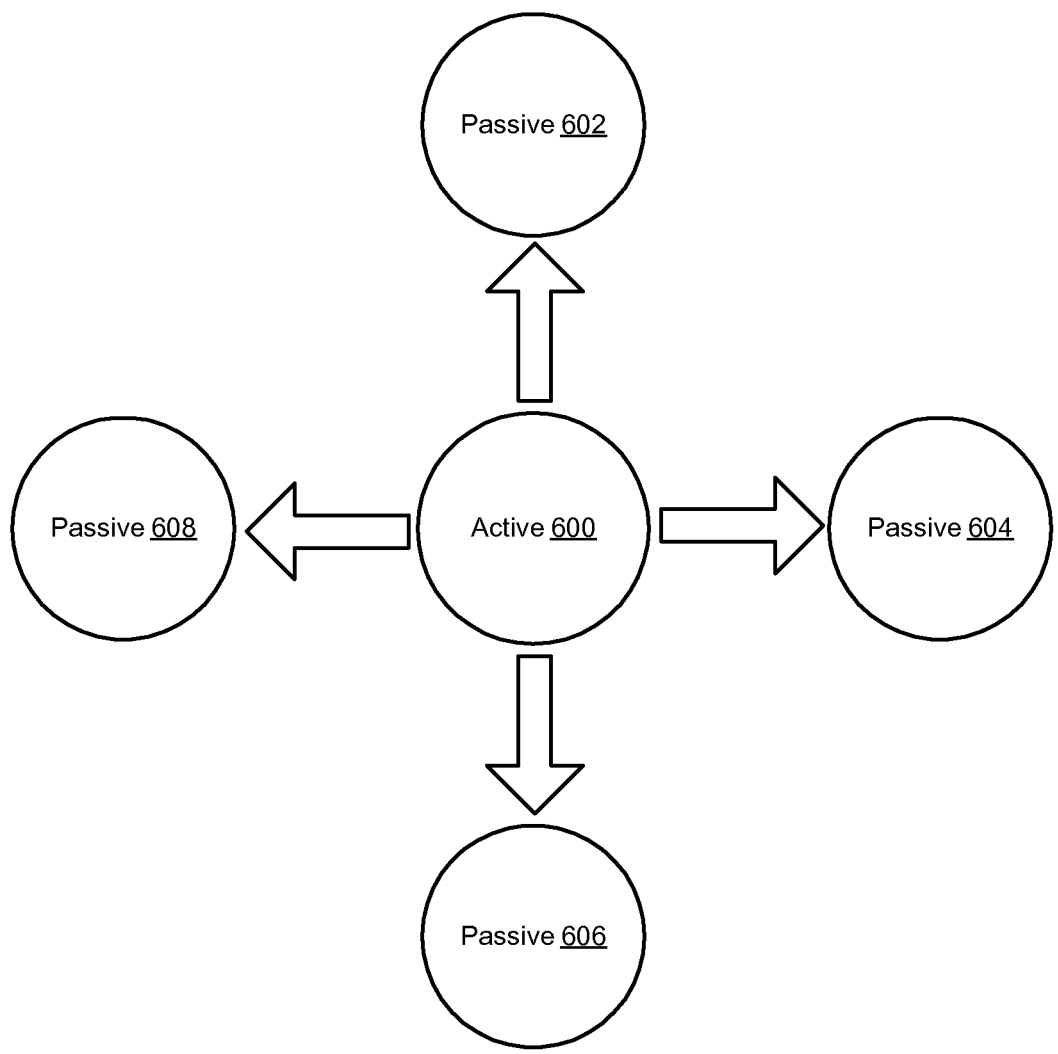

FIG. 6 is an illustration of the multi-site "hub spoke" active/passive deployment of event distribution, in accordance with various embodiments of the invention. In this topology, there is one centralized cluster 600 that is distributing its event data out to a set of multiple additional clusters 602, 604, 606, 608. This deployment is similar to the one illustrated in FIG. 4, except that there is a set of multiple passive clusters rather than just one. The hub and spoke model is often useful in publishing scenarios where a publishing house wishes to have all of the publication data available at multiple sites available for query without the need to request the data over a wide area network (WAN) such as the Internet.

Figure 7:
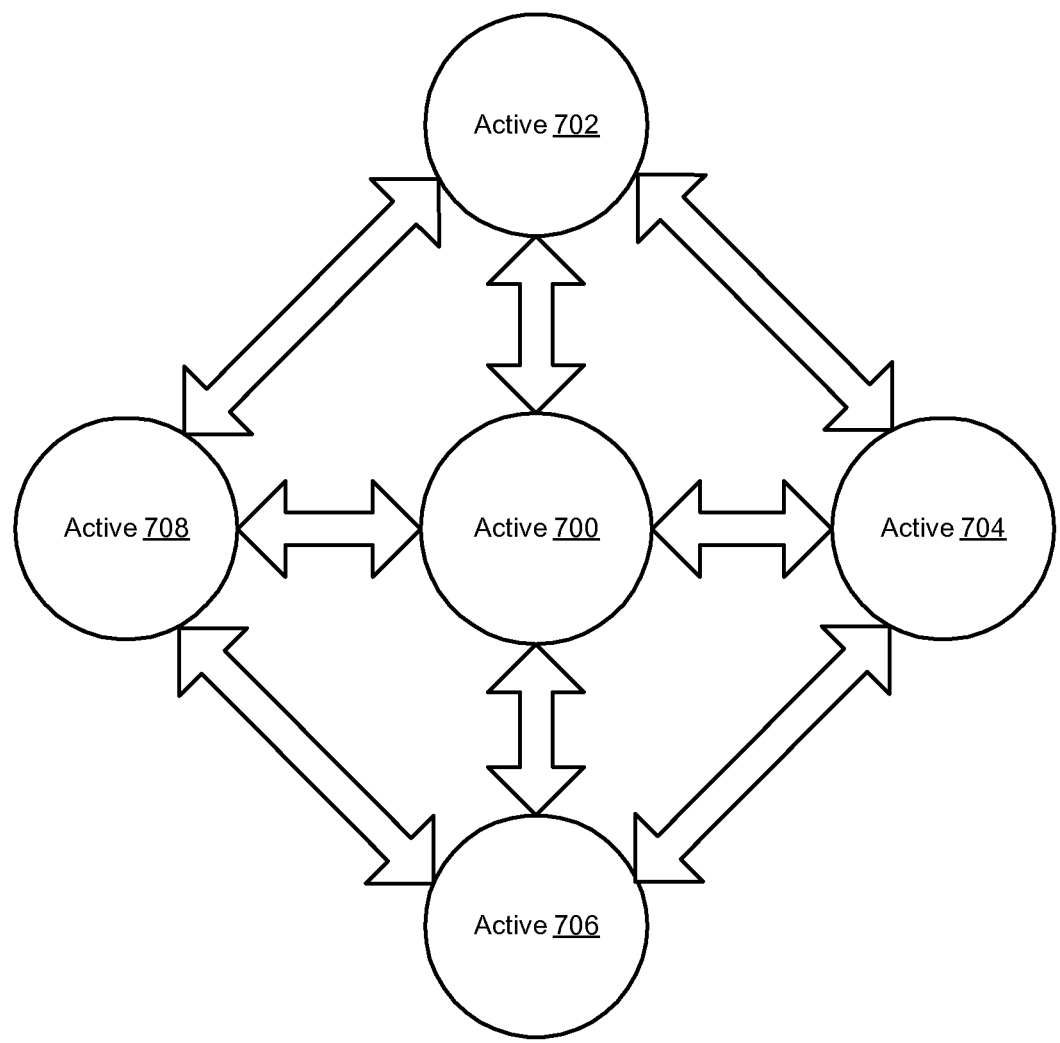

FIG. 7 is an illustration of a multi-site active/active deployment of event distribution, in accordance with various embodiments of the invention. In this topology, all clusters 700, 702, 704, 706, 708 are actively distributing their event information to each of the other clusters. This arrangement is similar to the one illustrated in FIG. 5 with the difference being that there are multiple clusters and each cluster is distributing their event data to all other clusters.

Figure 8:
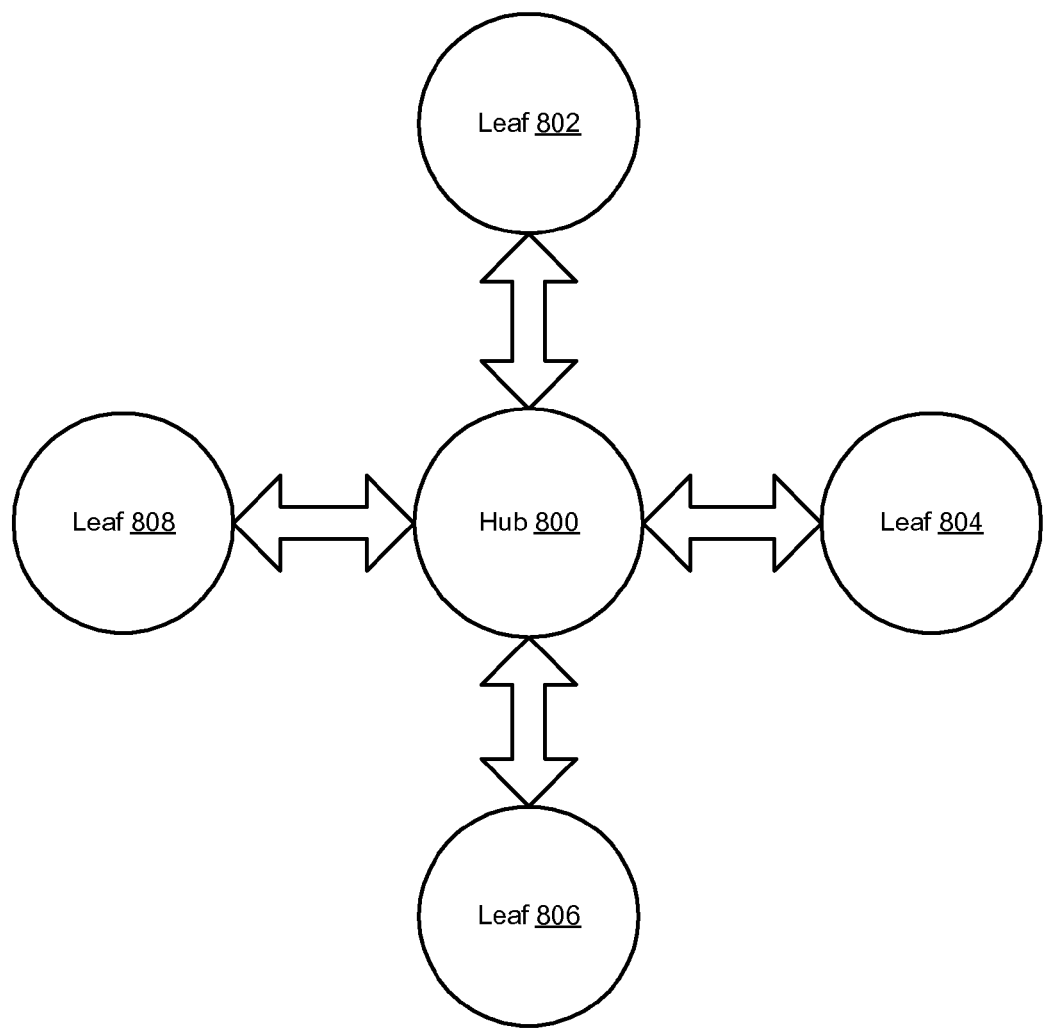

FIG. 8 is an illustration of centralized distribution deployment of event distribution in accordance with various embodiments of the invention. In this topology, there is a centralized hub 800 that is distributing events to all of the spokes 802, 804, 806, 808 (similar to the topology illustrated in FIG. 6) however in this centralized distribution, the spokes are also actively distributing their respective event information back to the central hub 800. As such, each of the leaves 802, 804, 806, 808 have an active connection to one and only one other cluster 800. This deployment can be contrasted with multi-site active/active deployment in that in the centralized distribution deployment uses one centralized hub and all of the spoke clusters distribute their event data only to the central hub and not to each other. The central hub then is responsible for replicating these updates to all of the spoke clusters. By way of example, if the central hub was the New York cluster and there was an update in the Singapore cluster, the Singapore cluster would actively distribute its events to the New York cluster first and then the New York cluster would actively relay that information to all remaining destinations (e.g. Hong Kong, London, Taipei, etc.).

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing an event distribution pattern for a distributed data grid, said system comprising:
    a cluster of computer servers that, together, comprise a node of the distributed data grid wherein at least one of said computer servers has an application deployed thereon;
    a primary memory cache of the node, the primary memory cache distributed across the cluster of computer servers that comprise the node, and configured to store live application objects, wherein the live application objects comprise a lifecycle and a start method, implement a particular interface, and execute actions in response to events that occur on or about themselves;
    a backup memory cache of the node, the backup memory cache distributed across the cluster of computer servers that comprise the node;
    an event distributor provided on at least one of said computer servers, wherein the event distributor provides a domain for sending events defined by said application;
    a live event channel controller object, which is a live application object, stored as an entry in the primary cache of the node of said distributed data grid; and
    a listener, active on the node of the distributed data grid, wherein the listener is configured to detect an insertion of live application objects as data stored in the primary cache and invoke the start methods of the inserted live application objects;
    wherein the listener detects an insertion for storage of the live event channel controller object into the primary cache of the node of the distributed data grid and invokes the start method of the live event channel controller object; and
    wherein, when the start method of the live event controller object is invoked, the live event channel controller object is configured to:
        receive one or more events defined by said application from the event distributor, and
        execute one or more actions in response to state changes in the live event channel controller object's lifecycle, including providing the one or more events to a set of event channels that distribute data associated with said one or more events to a set of destinations.

2. The system of claim 1, wherein the live event channel controller object listens on a topic, wherein the event distributor places the one or more events onto the topic, and wherein the live event channel controller object distributes the one or more events from the topic to the set of destinations using the set of event channels.

3. The system of claim 1, wherein the system comprises a plurality of nodes, each having a primary cache, whereupon promoting the live event channel controller object to the primary cache on a particular node, the live event channel controller object is activated on that node.

4. The system of claim 1, wherein the system comprises a plurality of nodes, each having a primary cache and a backup cache, wherein the live event channel controller object is backed up to one or more backup caches, so that in the event a node hosting the live event channel controller object fails, the live event channel controller object is promoted to a primary cache on another node.

5. The system of claim 1, wherein the system comprises a plurality of event channel controller objects, including a live event channel controller object for every destination to which events are to be distributed.

6. The system of claim 1, wherein the distributed data grid provides an application programming interface (API) to implement a pattern of the live event channel controller object.

7. The system of claim 1, wherein the data grid is an in-memory data grid.

8. A method for providing an event distribution pattern for a distributed data grid, said method comprising:
providing a configuration for a cluster of computer servers, wherein the configuration, when deployed across the cluster of computer servers, configures the cluster of computer servers to perform the additional steps of:
configuring the cluster of computer servers as a node of the distributed data grid;
providing a primary memory cache that is distributed across the cluster of computer servers and a backup memory cache that is distributed across the cluster of computer servers;
configuring the primary memory cache for storing live application objects, wherein the live application objects comprise a lifecycle and a start method, implement a particular interface, and execute actions in response to events that occur on or about themselves;
providing an event distributor on at least one of said computer servers, wherein the event distributor provides a domain for sending events defined by an application deployed on at least one of the computer servers;
providing a live event channel controller object, which is a live application object, and storing the live event channel object as an entry in said primary cache of the node of the distributed data grid;
providing a listener that is active on the node of the distributed data grid, wherein the listener is configured to detect an insertion of live application objects as data stored in the primary cache and invoke the start methods of the inserted live application objects; and
detecting, by the listener, the storing of the live event channel controller object in the primary cache of the node of the distributed data grid and invoking the start method of the live event channel controller object, wherein the invoking of the start method of the live event channel controller object configures the live event channel controller object to perform the steps of:
receiving one or more events defined by said application from the event distributor; and
executing one or more actions in response to state changes in the live event channel controller object's lifecycle, including providing the one or more events from the live event channel controller object to a set of event channels that distribute data associated with said one or more events to a set of destinations.

9. The method of claim 8, wherein the live event channel controller object listens on a topic, wherein the event distributor places the one or more events onto the topic, and wherein the live event channel controller object distributes the one or more events from the topic to the set of destinations using the set of event channels.

10. The method of claim 8, further comprising providing a plurality of nodes, each having a primary cache, whereupon promoting the live event channel controller object to the primary cache on a particular node, the live event channel controller object is activated on that node.

11. The method of claim 8, further comprising providing a plurality of nodes, each having a primary cache and a backup cache, wherein the live event channel controller object is backed up to one or more backup caches, so that in the event a node hosting the live event channel controller object fails, the live event channel controller object is promoted to a primary cache on another node.

12. The method of claim 8, further comprising providing a plurality of event channel controller objects including a live event channel controller object for every destination to which events are to be distributed.

13. The method of claim 8, further comprising:
implementing, by the distributed data grid, an application programming interface (API) to implement a pattern of the live event channel controller object.

14. The method of claim 8, wherein the data grid is an in-memory data grid.

15. A non-transitory computer readable storage medium storing a set of instructions thereon, the instructions, when executed by a cluster of computer servers, configure the cluster of computer servers as a node of a distributed data grid, and cause the node of the distributed data grid to perform the steps comprising:
providing a primary memory cache that is distributed across the cluster of computer servers and a backup memory cache that is distributed across the cluster of computer servers;
configuring the primary memory cache for storing live application objects, wherein the live application objects comprise a lifecycle and a start method, implement a particular interface, and execute actions in response to events that occur on or about themselves;
providing an event distributor on at least one of said computer servers, wherein the event distributor provides a domain for sending events defined by an application deployed on at least one of the computer servers;
providing a live event channel controller object, which is a live application object, and storing the live event channel object as an entry in said primary cache of the node of the distributed data grid;

providing a listener that is active on the node of the distributed data grid, wherein the listener is configured to detect an insertion of live application objects as data stored in the primary cache and invoke the start methods of the inserted live application objects; and detecting, by the listener, the storing of the live event channel controller object in the primary cache of the node of the distributed data grid and invoking the start method of the live event channel controller object, wherein the invoking of the start method of the live event channel controller object configures the live event channel controller object to perform the steps of:

receiving one or more events defined by said application from the event distributor; and executing one or more actions in response to state changes in the live event channel controller object's lifecycle, including providing the one or more events from the live event channel controller object to a set of event channels that distribute data associated with said one or more events to a set of destinations.

16. The non-transitory computer readable storage medium of claim 15, wherein the live event channel controller object listens on a topic, wherein the event distributor places the one or more events onto the topic, and wherein the live event channel controller object distributes the one or more events from the topic to the set of destinations using the set of event channels.

17. The non-transitory computer readable storage medium of claim 15, wherein the method further comprises providing a plurality of nodes, each having a primary cache, whereupon promoting the live event channel controller object to the primary cache on a particular node, the live event channel controller object is activated on that node.

18. The non-transitory computer readable storage medium of claim 15, wherein the method further comprises providing a plurality of nodes, each having a primary cache and a backup cache, wherein the live event channel controller object is backed up to one or more backup caches, so that in the event a node hosting the live event channel controller object fails, the live event channel controller object is promoted to a primary cache on another node.

19. The non-transitory computer readable storage medium of claim 15, wherein the method further comprises providing a plurality of event channel controller objects including a live event channel controller object for every destination to which events are to be distributed.

20. The non-transitory computer readable storage medium of claim 15, the steps further comprising:

implementing, by the distributed data grid, an application programming interface (API) to implement a pattern of the live event channel controller object.

* * * * *